US006224688B1

(12) United States Patent
Takemura et al.

(10) Patent No.: US 6,224,688 B1
(45) Date of Patent: May 1, 2001

(54) ROLLING BEARING

(75) Inventors: Hiromichi Takemura; Yasuo Murakami, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/133,819

(22) Filed: Aug. 13, 1998

(30) Foreign Application Priority Data

Aug. 18, 1997 (JP) .................................................. 9-221742
Sep. 4, 1997 (JP) .................................................. 9-239642

(51) Int. Cl.[7] ............................ C22C 29/00; F16H 49/00
(52) U.S. Cl. .......................... 148/318; 148/319; 148/333; 148/906; 384/492
(58) Field of Search ..................................... 148/318–319, 148/328, 333, 906; 420/100; 428/408; 384/492, 625, 912

(56) References Cited

U.S. PATENT DOCUMENTS 5,403,545   4/1995   Takata et al. ........................ 420/112

FOREIGN PATENT DOCUMENTS

| 2 306 506 | 5/1997 | (GB) . |
| 1-255650 | 10/1989 | (JP) . |
| 3-24246 | 2/1991 | (JP) . |
| 5-255809 | 10/1993 | (JP) . |
| 7-110988 | 11/1995 | (JP) . |
| 9-53169 | 2/1997 | (JP) . |

OTHER PUBLICATIONS

Swahn et al., "Martensite Decay During Rolling Contact Fatigue in Ball Bearings", *Metallurgical Transactions A*, Aug. 1976, pp. 1099–1110.

Murakami et al., "Rolling Contact Fatigue Life under Contaminated Lubrication with Several Foreign Paticles [sic]", NSK Technical Journal No. 655, 1993, pp. 17–24.

Steel Standard Manual, Japan Steel Association, 1967.

Ciruna et al., "The Effect of Hydrogen on the Rolling Contact Fatigue Life of AISI 52100 and 440C Steel Balls", *Wear*, 24, 1973, pp. 117–118.

*Primary Examiner*—Sikyin Ip
(74) *Attorney, Agent, or Firm*—Evenson, McKeown, Edwards & Lenahan, P.L.L.C.

(57) ABSTRACT

A rolling bearing having a plurality of rolling elements located between a fixed race and a rotating race, wherein at least one of bearing components comprising the fixed race, rotating race and rolling elements is made of a steel which contains from 0.05 to 0.40% by weight of at least one selected from the group consisting of Ti, Nb and Al along with from 0.65 to 1.20% by weight of C, from 0.05 to 0.70% by weight of Si, from 0.2 to 1.5% by weight of Mn, from 0.15 to 2.0% by weight of Cr, not more than 01.01% by weight of N and unavoidable contaminating elements and wherein particles of at least one of Ti carbide, Ti carbonitride, Nb carbide, Nb carbonitride and Al nitride are dispersed and deposited at least in the vicinity of the surface of the at Least one of bearing components. The rolling bearing suffers from few impressions on the raceway surface, has an elevated wear resistance, inhibits constitutional changes during rolling fatigue, prevents the enlargement of crystal grains in the step of hardening, achieves a long life and a high reliability even under contaminated lubrication or under clean lubrication, and scarcely undergoes corrosion pitting (including hydrogen induced cracking) even under such conditions as to cause corrosion pitting due to invasion of water.

9 Claims, 4 Drawing Sheets

ROLLING BEARING

FIELD OF THE INVENTION

The present invention relates to a rolling bearing, and more specifically, relates to the prolongation of the life of rolling bearings to be used in transmissions, engine accessories, hub wheels, etc. of automobiles, agricultural equipments, construction equipments, steel industry equipments, etc.

BACKGROUND OF THE INVENTION

There have been employed rolling bearings made of high-carbon Cr steels as specified in JIS. Among these steels, SUJ2 has been used in general. SUJ2 is hardened and then tempered prior to the use such that it has a surface hardness of from about HRC60 to 63 and a retained austenite content of from about 5 to 15%.

When lubricants are contaminated with impurities, the rolling life of rolling bearings is considerably shortened, compared with the case where they are operated under clean lubrication. These impurities include metallic swarfs, shavings, flushes and wear-out powders. When rolling bearings are used under such contaminated conditions, the rolling bearing raceway and the raceway surface of races and rolling elements suffer from impressions (damage), from which flaking occurs. As a result, the life of the rolling bearings is seriously shortened.

According to "Ibutsu Konnyu Joken to Korogari Tsukare Jumyo (Contaminated conditions and rolling fatigue life)" (NSK Technical Journal No. 1555, p. 17–24, 1993), the life of rolling bearings is reduced to about ⅛, compared with the case when they are operated under clean lubrication, depending on the amount, hardness and size of impurities. This experiment is a simulation of a phenomenon that the raceway surface of a rolling bearing suffers from small impressions of several ten to several hundred $\mu$m due to the contamination with impurities and flaking arises from these impressions, thus shortening the rolling fatigue, life as in the case of pitting in automotive transmission gears.

JP-B-7-110988 discloses a method wherein an appropriate amount of fine carbides are formed in the surface layer of at least one of the outer race, inner race and rolling elements of a rolling bearing to thereby improve the surface hardness and, at the same time, an appropriate amount of austenite is retained in the surface layer to thereby prevent micro-cracking under the contamination with impurities (the term "JP-B" as used herein means an "examined Japanese patent publication").

JP-A-5-255809 discloses bearing steels which contain from 0.65 to 0.90% by weight of C, from 0.15 to 0.50% by weight of Si, from 0.15 to 1.00% by weight of Mn, from 2.0 to 5.0% by weight of Cr and from 0.0090 to 0.0200% by weight of N together with from 0.010 to 0.050% of Al and/or from 0.005 to 0.50% by weight of Nb, thus lowering the C content. In these steels, the formation of a harmful white layer can be prevented by the effect of suppressing the scattering of carbon atoms attributable to mainly Cr to thereby prolong the rolling life. Moreover, the addition of Al, Nb and N contributes to the prevention of the enlargement of austenite crystal grains. The term "JP-A" as used herein means an "unexamined published Japanese patent application".

Moreover, JP-A-9-53169 discloses case hardening steels which contain from 0.1 to 0.25% of C, from 0.2 to 0.4% of Si, from 0.3 to 0.9% of Mn and from 0.5 to 0.9% of Cr, together with at least one of from 0.3 to 4.0% of Ni, from 0.01 to 0.3% of Ti, from 0.01 to 0.3% of Nb, from 0.01 to 0.3% of V and from 0.01 to 0.3% of :Zr and have a surface hardness regulated to Hv 650 to 800.

JP-A-1-255650 discloses that bearing steels which contain from 1.1 to 1.5% by weight of carbon, from 1.0 to 2.0% by weight of silicon and from 0.7 to 1.3% by weight of chromium and have a surface hardness of HRC 64 or above show elevated resisting property for temper softening and scarcely undergo plastic deformation which shortens the life.

JP-A-3-24246 discloses high carbon chromium bearing steels containing from 0.015 to 0.10% by weight of nitrogen and not more than 0.001% by weight of titanium. In these high carbon chromium bearing steels, the elevated content of nitrogen contributes to an increase in the retained austenite in the step of hardening while inhibiting the formation of TiN (titanium nitride) inclusions which are harmful to the rolling life.

In the case of the bearings of JP-A-1-255650 as described above, the matrix is reinforced and surface impressions caused by impurities, if any, are lessened by regulating the surface hardness to HRC 64 or above. When such a bearing is exposed to the invasion of hard impurities or large impressions, however, it is frequently observed that severe impressions are formed. In such a case, moreover, the high surface hardness exhibits an undesirable adverse effect of accelerating the spreading of cracking starting from the impressions. Accordingly, it cannot be expected that the life of the rolling bearings can be prolonged thereby.

In the case of the bearings of JP-A-3-24246, it is expected that the spreading of cracking can be retarded due to the high toughness of the material. However, impressions are frequently formed upon the invasion of impurities, etc. into the bearing raceway sur-face. Thus, no prolongation of the life can be expected thereby. Moreover, only titanium nitride can be formed under clean lubrication and the constitutional change occurring under high contact pressure cannot be retarded in this case. Thus, no prolonged long life can be expected thereby too.

Since alloy elements such as titanium and vanadium are merely added to the carburized and hardened parts in JP-A-9-53169, the material per se has a good impact resistance and a high toughness. However, it cannot be expected that any fine carbides can be formed thereby. When impurities invade, therefore, the raceway surface is liable to suffer from impressions. Thus, the flaking at the early stage cannot be effectively prevented in such a case.

However, the bearings disclosed by the first patent as cited above, i.e., JP-B-7-110988 are made of alloy steels containing at least from 0.3 to 0.6% by weight of C and from 3 to 14% by weight; of Cr and have been carburized or carbonitrided and hardened by heating. Thus, the heat treatment costs a great deal. In this case, moreover, the fine carbide has a large average particle diameter of 0.5 to 1.0 $\mu$m and, therefore, it cannot be expected to obtain fine crystal grains.

In the bearings disclosed by the second patent, i.e., JP-A-5-255809, the carbon content is lowered and the formation of a harmful white layer is prevented by the effect of suppressing the scattering of carbon atoms attributable to mainly Cr to thereby prolong the rolling life. It is stated therein, moreover, that the addition of Al, Nb and N contributes to the prevention of the enlargement of austenite crystal grains. However, the grain size can be reduced only by about 10 in grain number merely by adding Al and Nb. Thus, it cannot be expected that the rolling life is prolonged thereby.

Since alloy elements such as Ti and V are merely added to the carburized and hardened parts in the case hardened steels disclosed in the third patent, i.e., JP-A-9-53150, the material per se has a good impact resistance and a high toughness. However, it cannot be expected that any fine carbides can be formed thereby. When impurities invade, therefore, the raceway surface is liable to suffer from impressions. Thus, the flaking at the early stage cannot be effectively prevented in such a case.

When a high contact stress is applied to a bearing, a layer hardly corroded with a corrosion liquor is formed about 100 to 300 µm below the raceway surface, i.e., a constitutional change, as reported by H. Swahn et al., "Metallugical Transactions A volume 7A, August (1976), 1099–1110, Martensite Decay During Contact Fatigue in Ball Bearing". Thus, there arises a problem that this constitutional change results in flaking.

An example of the shortening of the life of a rolling bearing due to the invasion of water is reported by J. A. Cirura et al. "Wear, 24 (1973) 107–118, The Effect of Hydrogen on the Rolling Contact Fatigue Life of AISI 52100 and 440C Steel Balls". According to this report, when water is added to a lubricant in a four-point contact rolling test, the life of the rolling bearing becomes about 1/10 time shorter than the life before the addition. In a rolling fatigue test with the use of hydrogen-charged steel balls, stainless steel balls show longer life than bearing steel balls of type 2. However, it is undesirable in practice to prolong the life of bearings by using stainless steel. balls which are more expensive than bearing steel balls of type 2.

SUMMARY OF THE INVENTION

The present invention has been completed to solve the above-mentioned problems. Namely, it aims at providing a rolling bearing with a long life which hardly suffers from few impressions on the raceway surface, inhibits constitutional changes during rolling fatigue, prevents the enlargement of crystal grains in the step of hardening, achieves a long life and a high reliability even under contaminated lubrication or under clean lubrication, and scarcely undergoes corrosion pitting (including hydrogen induced cracking) even under such conditions as to cause corrosion pitting due to invasion of water or a highly durable rolling bearing which suffers from few impressions on the raceway surface under the contamination with impurities, achieves a long life and a high reliability even under contaminated lubrication or under clean lubrication, and scarcely undergoes corrosion pitting (including hydrogen induced cracking) even under such conditions as to cause corrosion pitting due to invasion of water.

The above objects are achieved by a rolling bearing having a plurality of rolling elements located between a fixed race and a rotating race,
wherein at least one of the bearing components, which comprises the fixed race, rotating race and rolling elements, is made of a steel which contains from 0.05 to 0.40% by weight of at least one selected from the group consisting of Ti, Nb and Al along with from 0.65 to 1.20% by weight of C, from 0.05 to 0.70% by weight of Si, from 0.2 to 1.5% by weight of Mn, from 0.15 to 2.0% by weight of Cr, not more than 0.01% by weight of N and unavoidable contaminating elements and
wherein at least one of Ti carbide, Ti carbonitride, Nb carbide, Nb carbonitride and Al nitride are dispersed and deposited at least in the vicinity of the surface of the at least one of the bearing components.

Particularly, first and second embodiments of items (1) and (2) described below are preferred.

(1) A rolling bearing having a plurality of rolling elements located between a fixed race and a rotating race,
wherein at least one of the fixed race, rotating race and rolling elements is made of a steel which contains from 0.65 to 1.20% by weight of C, from 0.05 to 0.70% by weight of Si, from 0.2 to 1.5% by weight of Mn, from 0.15 to 2.0% by weight of Cr, from 0.05 to 0.40% by weight of Ti, not more than 0.01% by weight of N and unavoidable contaminating elements and
wherein at least one of titanium carbide and titanium carbonitride having an average particle diameter of 20 nm or less is dispersed and deposited in the vicinity of the surface of the at least one of the fixed race, rotating race and rolling elements.

(2) A rolling bearing having a plurality of rolling elements located between a fixed race and a rotating race,
wherein at least one of the fixed race, rotating race and rolling elements is made of a steel which contains from 0.05 to 0.40% by weight of at least one selected form the group consisting of Ti, Nb and Al along with from 0.65 to 1.20% by weight of C, from 0.05 to 0.70% by weight of Si, from 0.2 to 1.5% by weight of Mn, from 0.15 to 2.0% by weight of Cr, not more than 0.01% by weight of N, and unavoidable contaminating elements and
wherein at least one of Ti carbide, Ti carbonitride, Nb carbide, Nb carbonitride and Al nitride having an average particle diameter of from 50 to 300 nm is dispersed and deposited at least in the vicinity of the surface of the at least one of the fixed race, rotating race and rolling elements.

Figure 1:
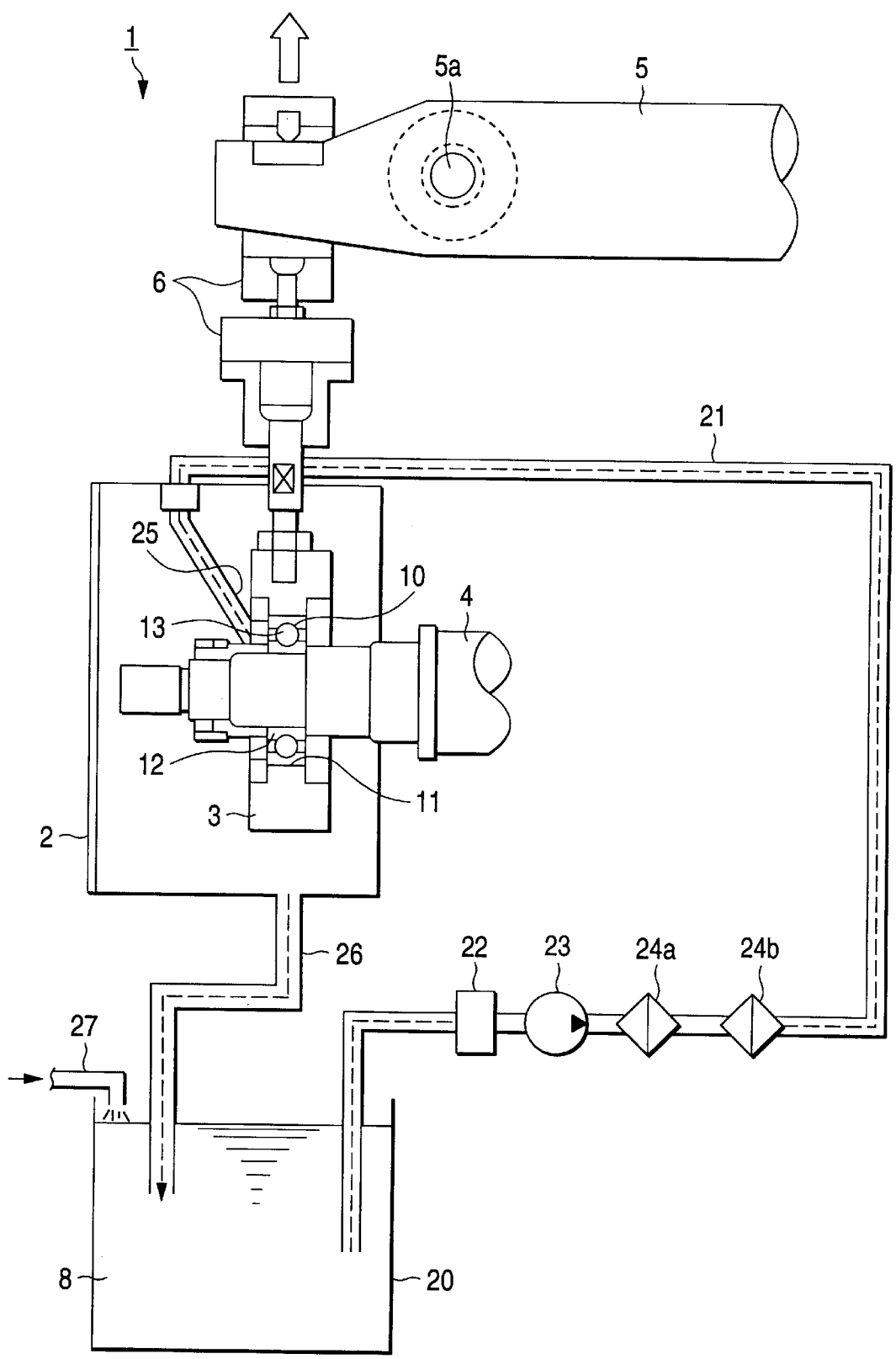
FIG. 1 is a schematic view showing an apparatus for life test.

The numerical values given in these figures each has the following meaning.

1: overhang type apparatus for life test,
2: chamber,
3: housing,
4: rotating shaft,
5: load lever,
5a: horizontal axis
6: load shaft,
8: lubricant,
10: bearing, 11: outer race, 12: inner race,
13: rolling element (ball),
20: oil tank, 21: lubricant-feeding circuit,
22: flow meter, 23: pump,
24a, 24b : filter, 25: oil discharge,
26: recovery circuit, 27: supplying circuit.

DETAILED DESCRIPTION OF THE INVENTION

In the rolling bearing of the first embodiment according to the resent invention, from 0.05 to 0.40% by weight of titanium is added so that fine particles of titanium carbide and titanium carbonitride with an average particle diameter of 20 nm or less are dispersed and deposited in the steel. Thus, the alloy matrix is reinforced to be hard and the raceway surface scarcely suffers from impression.

Furthermore, the rolling bearing of the present invention has an elevated toughness owing to the dispersion and deposition of the fine particles of titanium carbide and titanium carbonitride. Therefore, the spreading of cracks, if any, can be retarded. Moreover, constitutional changes caused by matrix fatigue can be prevented or retarded and thus the rolling life can be largely prolonged.

Even under the lubrication conditions with the invasion of water, TiC (titanium carbide) and TiCN (titanium carbonitride) particles with an average particle diameter of 20 nm or less, which have been dispersed and deposited in the rolling bearing of the present invention, adsorb water at the TiC and TiCN interfaces, thus preventing the occurrence of any defect. These particles also lower the hydrogen concentration at the plastic deformation region at the crack end and, as a result, can retard corrosion pitting (including hydrogen induced cracking).

In the first embodiment, it is more preferred that the at least one of titanium carbide and titanium carbonitride has an average particle diameter of 10 nm or less, more preferably 5 nm or less, and/or 100 or more of the at least one of titanium carbide and titanium carbonitride particles are present per 1 $\mu m^2$.

Furthermore, the rolling bearing of the second embodiment according to the present invention, from 0.05 to 0.40% by weight of at least one selected from the group consisting of Ti, Nb and Al is added to the steel and particles of at least one of Ti carbide, Ti carbonitride, Nb carbide, Nb carbonitride and Al nitride having an average particle diameter of from 50 to 300 nm are dispersed therein. Thus, the matrix is dispersed and austenite crystal grains become smaller so as to improve the hardness and wear resistance of the steel. Therefore, the roll bearing suffers form little impression in the raceway surface even though it is contaminated with impurities.

Furthermore, the rolling bearing of the present invention has an elevated toughness and, therefore, the spreading of cracks, if any, can be retarded. Moreover, constitutional changes caused by matrix fatigue can be prevented or retarded and thus the rolling life can be largely prolonged.

In particular, the particles in the second layer of TiC, TiCN, NbC, NbCN and AlN reduce the area of grain boundary and lower the energy of total grain boundary and immobilize the particles by preventing the migration thereof, thus contributing to the formation of fine crystal grains. When the particles in the second layer are ultra-fine ones (for example, less than 50 nm in diameter), the pinning effect is too poor to prevent the enlargement of crystal grains. In such a case, no ultra-fine crystal grain can be obtained. The first layer contains Cr carbide and Cr carbonitride particles. After the completion of the hardening, the crystal grains (former austenite grains) show a grain size number of 11 or above (i.e., average diameter: 7.8 $\mu m$).

Under such conditions as causing corrosion pitting due to the invasion of water, hydrogen is trapped in the ultrafine austenite crystal bourdary face and the particles of Ti carbide, Ti carbonitride, Nb carbide, Nb carbonitride Al nitride, etc. serve as hydrogen trap sites and thus disperse and adsorb hydrogen at the fine carbides/nitrides interfaces, thus preventing the occurrence of any defect. These particles also retard the accumulation of hydrogen around the crack end and, as a result, lower the hydrogen concentration in the plastic deformation region at the crack end, thus inhibiting corrosion pitting (including hydrogen induced cracking).

With respect to the second embodiment, it is preferred that the former austenite grains present in the vicinity of the surface have an average diameter of 7.8 $\mu m$, and/or 50 particles or more of the at least of Ti carbide, Ti carbonitride, Nb carbide, Nb carbonitride and Al nitride having an average diameter of 50 to 300 nm are present per 30 $\mu m^2$.

The term "vicinity of the surface of the bearing component" as used herein may be defined, more specifically, as the surface of the bearing component having a depth corresponding to 2% of the diameter (Da) of rolling elements used.

Now, the reason for the limitation of the content of each component of bearing steel in the outer race and inner race of the present invention will be described.

1) C: 0.65–1.20%

C is an element which imparts the hardness required as a rolling bearing. A steel with a C content less than 0.65% sometimes fails to ensure the hardness required as a rolling bearing (i.e., HRC 59 or above). When the C content exceeds 1.20%, on the other hand, large carbide particles are frequently formed and thus the fatigue life and the impact load are deteriorated in some cases.

2) Si: 0.05–0.70%

Si is an element which retards constitutional changes and improves the hardenability. When the Si content is less than 0.05%, the steel cannot be sufficiently deacidified. When it exceeds 0.70%, on the other hand, the workability is seriously deteriorated.

3) Mn: 0.2–1.5%

Mn is an element which efficiently improves the hardenability. When the Mn content is less than 0.2%, only an insufficient hardenability can be obtained. When it exceeds 1.5%, on the other handa, the workability is deteriorated.

4) Cr: 0.15–2.0%

Cr is an element which improves the hardenability and promotes the spheroidizing of carbides. The Cr content should be at least 0.15%. When the Cr content exceeds 2.0%, the deposited carbide particles are enlarged and the average crystal size becomes excessively large. In such a case, the machinability is sometimes deteriorated too.

5) Ti: 0.05–0.40%

Ti is an important additive which is dispersed and deposited in the form of fine particles of Ti carbide and Ti carbonitride so as to prolong the rolling life of the bearing. Ti has another effect of preventing crystal grains from enlargement in the step of hardening. It also serves as hydrogen trap sites. When the Ti content is less than 0.05%, most of Ti would be deposited as Ti carbide and Ti carbonitride particles of 1 $\mu m$ or above in diameter. In such a case, the effects of the dispersion and deposition of the Ti carbide and Ti carbonitride particles becomes insufficient. When its content exceeds 0.40%, on the other hand, the workability is deteriorated and the inclusions (TiN and TiS) of 5 $\mu m$ or above, which shorten the rolling life, are increased. As a result, the rolling life of the rolling bearing is shortened.

6) Al: 0.05 to 0.40%

Al is distributed in the steel as fine particles of AlN and prevents the enlargement of crystal grains in the step of hardening. To obtain fine AlN particles, it is required to use at least 0.05% of Al. When the Al content exceeds 0.40%, however, the non-metallic inclusion, alumina ($Al_2O_3$) is formed in a large amount, which shortens the rolling life.

7) Nb: 0.05 to 0.40%

Similar to Al, Nb is an element which forms fine particles of carbide and nitride of Nb, which are dispersed in the steel, and thus prevent the growth of crystal grains in the step of hardening. To form fine NbC and NbCN particles, it is required to use at least 0.05% of Nb. When the Nb content exceeds 0.40%, however, the effect attains to the saturation level. In such a case, the workability of the steel is deteriorated and the material cost is unnecessarily elevated. Thus, the Nb content is limited to 0.05 to 0.40%.

8) N: not more than 0.01%

N effectively prolongs the rolling life due to the dispersion and deposition of the fine particles of Ti carbonitride, Nb carbonitride and Al nitride. When the N content exceeds 0.01%, however, Ti carbonitride and Ti nitride particles of 1 $\mu$m or above are increased, and Ti carbide particles and Ti carbonitride particles of 20 nm or more (i.e., including Ti carbide particles of 50 to 300 nm) are decreased.

9) Other unavoidable contaminating elements

P: not more than 0.02%

Among the unavoidable contaminating elements, phosphorus is an element which deteriorates the rolling life and toughness of the bearing. Thus, the upper limit thereof is defined as 0.02%.

S: not more than 0.02%

Among the unavoidable contaminating elements, sulfur is an element which improves the machinability. However, it binds to Mn and Ti to thereby form sulfide inclusions which shorten the rolling life of the bearing. Thus, the upper limit thereof is defined as 0.02%.

O: not more than 0.0016%

Among the unavoidable contaminating elements, oxygen is an element which forms oxide inclusions in the steel and thus shortens the rolling life of the bearing. Therefore, the upper limit thereof is defined as 0.0016%.

10) Average Particle Diameter of Titanium-based Deposits: 20 nm or less for the First Embodiment Titanium carbide and titanium carbonitride are dispersed and deposited in the steel to thereby reinforce the alloy matrix and improve the fatigue resistance and the wearing resistance. The smaller particles are the more effective.

Figure 2:
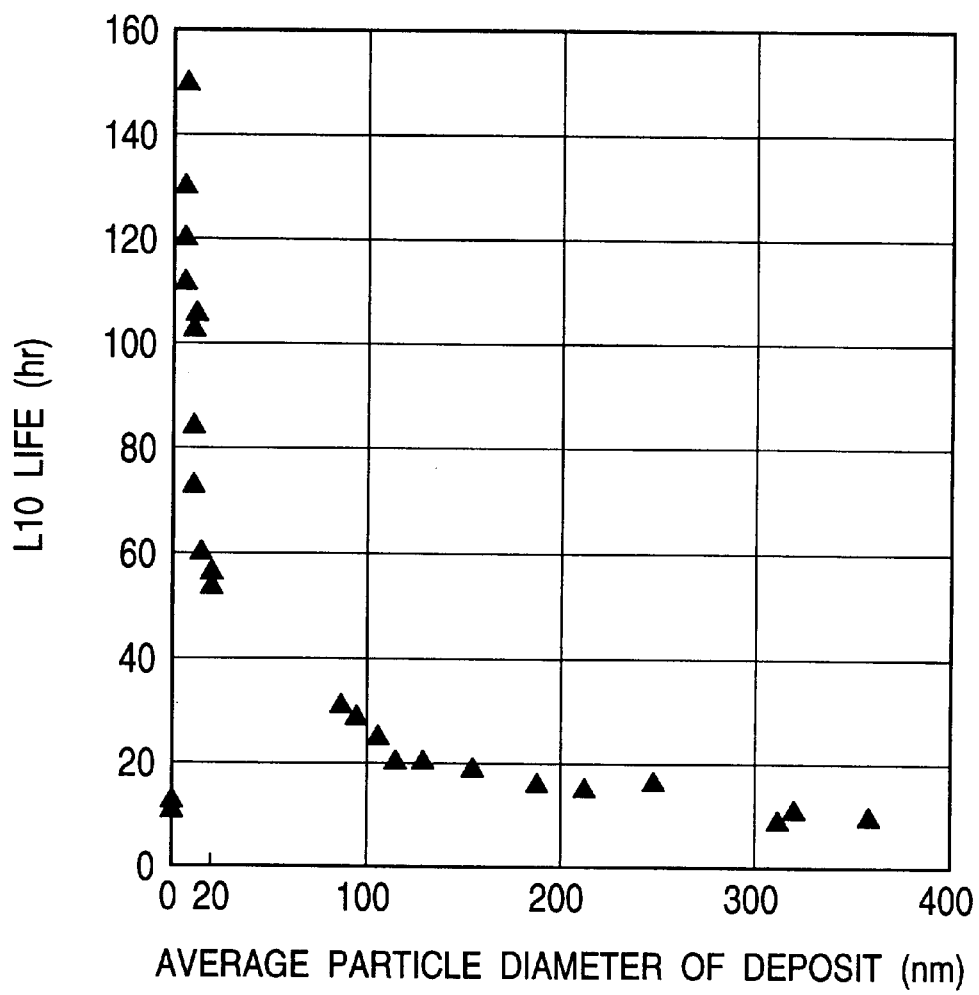
FIG. 2 is a graph showing the relationship between the average particle diameter of the deposit and the L10 life.

As FIG. 2 shows, it is found out that the L10 life of the bearing is rapidly prolonged in the region wherein the average particle diameter of TiC and TiCN deposits is 20 nm or less.

The higher deposition density of titanium carbide and titanium carbonitride brings about the better fatigue resistance and the better wearing resistance.

Figure 3:
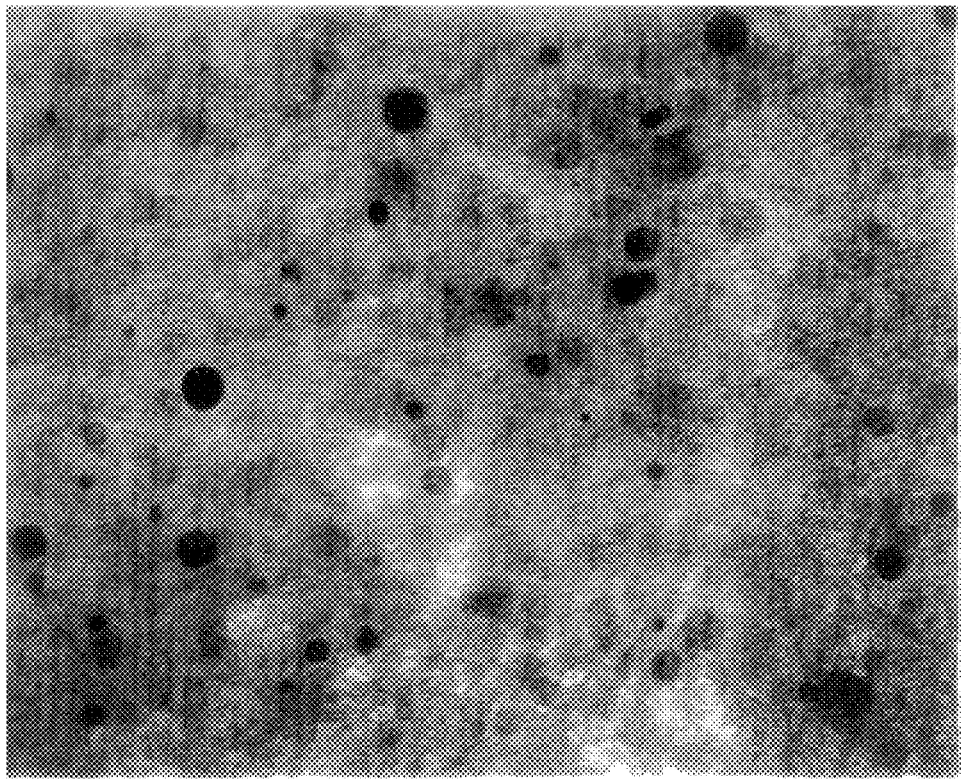
FIG. 3 is a transmission electron microscopic (TEM) photograph (200,000×magnification) of an extracted replica of the bearing steel metal tissue.

As FIG. 3 shows, a replica is extracted from the steel constituting the rolling bearing of the present invention and observed under a TEM. Thus, not less than 100 TiC or TiCN particles of 20 nm or lless in average particle diameter are observed per 1 $\mu$m$^2$ (0.20 $\mu$m$^2$×5 fields). Table 2 shows the area fraction. As Table 2 clearly shows, it is preferable that the area fraction of the TiC or TiCN ranges from about 0.5 to 20%. In this observation method, the TiC and TiCN images are introduced into an image analyzer and the area fraction per unit area is determined.

11) Average Particle Diameter of Deposit: 50 to 300 nm (for the Second Embodiment)

Figure 4:
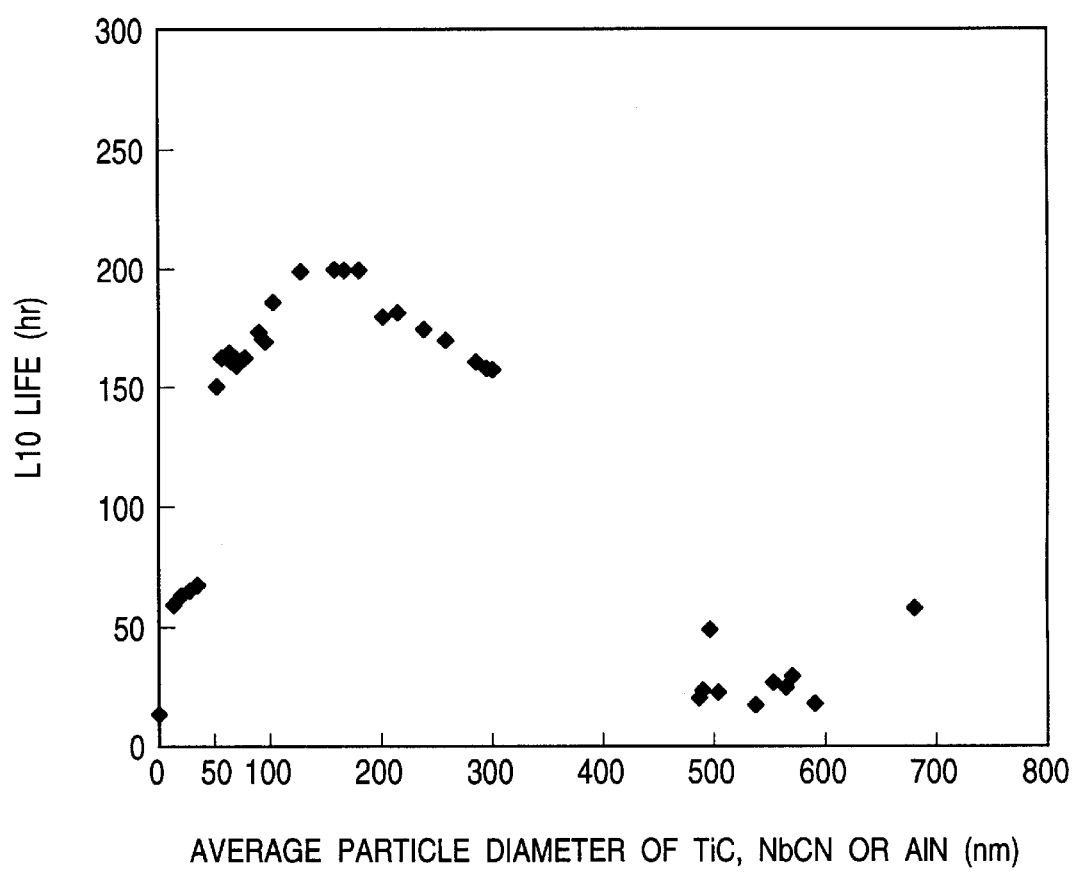
FIG. 4 is a graph showing the relationship between the average particle diameter of the deposit and the L10 life.

In the second embodiment, particles of Ti carbide, Ti carbonitride, Nb carbide, Nb carbonitride and Al nitride of 50 to 300 nm in average particle diameter are dispersed and deposited in the bearing steel of the outer race and the inner race. When the average diameter of these particles is less than 50 nm, the pinning effect is too poor to prevent the enlargement of the crystal grains and no ultrafine crystal grain can be obtained. When the average particle diameter of the deposits exceeds 300 nm, on the other hand, no pinning effect is achieved and thus crystal grains are enlarged. As a result, the desired strength cannot be obtained. It has been found out that the L10 life of the bearing is considerably shortened when the average particle diameter of the deposits in the steel is excluded from the scope of 50 to 300 nm as shown in FIG. 4.

It is still preferable that not less than 50 particles of Ti carbide, Ti carbonitride, Nb carbide, Nb carbonitride, and Al nitride of 50 to 300 nm in average particle diameter are contained per 30 $\mu$m$^2$ (3 $\mu$m$^2$×10 fields).

Now, various preferable embodiments of the present invention will be illustrated by reference to the attached figures and tables.

EXAMPLES

I. First Embodiment

Table 1 summarizes the components of the samples employed in Examples 1a to 15a and. Comparative Examples 1a to 15a. The samples of Examples 1a to 15a each has a composition falling within the range as specified in the present invention, while the compositions of the samples of Comparative Examples 1a to 15a are excluded therefrom, in particular, in either or both of titanium and nitrogen. By using steels of the compositions as listed in Table 1, bearing inner races were produced and rolling bearings having the thus obtained inner races were subjected to a life test. Now, the results of the evaluation of the life will be described.

First, the samples; of Examples 1a to 15a and Comparative Examples 1a to 15a were each subjected to a solution treatment by heating to 1,150 to 1,350° C. Thus, titanium was completely dissolved in the alloy matrix. Next, it was spheroidized in a temperature zone of 850 to 950° C. and then titanium carbide was dispersed and deposited as fine particles. The outer race and inner race were produced by cold processing the material of Table 1 followed by the conventional heat treatments (hardening at 840° C., oil quenching and tempering at 180° C.).

Titanium carbide and titanium carbonitride dispersed and deposited in the steel were examined in the following manner.

After the completion of the heat treatment, the bearing was cut and the section was polished with a baff. After performing niter corrosion, titanium carbide, etc. are extracted with acetyl cellulose followed by carbon deposition. Then, the extracted replica was observed. To determine the average particle diameter and area fraction of titanium carbide and titanium carbonitride, observation was carried out under a transmission electron microscopic (TEM) photograph (200,000×magnification). In this TEM observation, one field corresponded to 0.20 $\mu$m$^2$. Thus, the replica was observed in 5 fields (i.e., 1 $\mu$m$^2$ in total) and the average particle diameter and number of the deposited particles were determined. As a result, 100 or more titanium carbide and titanium carbonitride particles of 20 nm or less in average particle diameter were observed per 1 $\mu$m$^2$ in the bearing steels of Examples 1a to 15a, as shown in FIG. 3. Table 2 summarizes the area fractions (%) of the titanium carbide and titanium carbonitride deposits of 20 nm or less in average particle diameter.

The inner races showed surface hardness of from HRC 59 to 64, retained austenite of from 5 to 20 vol % and raceway surface roughness of from 0.01 to 0.03 $\mu$m Ra. In both of Examples and Comparative Examples, the outer races and the rolling elements were made of the same steels and subjected to the heat treatment so that the outer races and the rolling elements each had surface hardness of from HRC 59 to 64, the outer races had surface roughness of from 0.01 to 0.03 μm Ra and the rolling elements had surface roughness of from 0.003 to 0.010 μm Ra.

Next, the bearings of Examples and those of Comparative Examples were subjected to life tests according Experiments 1 to 3 effected under the following conditions.

In Experiments 1 to 3, use was made of an overhang type apparatus for life test 1 as shown in FIG. 1. In this overhang type apparatus for life test 1, a bearing 10 to be tested is enclosed in a housing 3. An outer race 11 is fixed to the housing 3 while an inner race 12 is fitted into a rotating shaft 4. When the rotating shaft 4 is rotated by driving a motor (not shown in the figure), the inner race 12 rotates and, at the same time, a ball 13 rolls. The housing 3 is connected to a load shaft 6 which is connected further to a load lever 5. When the load lever 5 is rocked around a horizontal axis 5a, a definite load is applied, via the load shaft 6, onto the outer race 11 fixed to the housing 3.

An oil discharge unit 25 connected to a lubricant-feeding circuit 21 is introduced into the housing 3 and thus a lubricant 8 is supplied toward the bearing 10. The feeding circuit 21 of the oil discharge unit 25 is connected to an oil tank 20 which contains a turbine oil VG68 as the lubricant. Into the oil tank 20, 5 cc/hr of the lubricant 8 is supplied via a supplying circuit 27.

Via this supplying circuit 27, contaminants such as iron powder or water may be intentionally added to the lubricant 8 in the oil tank 20. The supplying circuit 21 is provided with a flow meter 22, a pump 23 and filters 24a and 24b in this order from the downstream. The housing 3 and the oil discharge unit 25 are surrounded by a chamber 2 and the excessive lubricant 8 dropping into the chamber 2 is recovered to the oil tank 20 via a recovery circuit 26.

This overhang type apparatus for life test. is substantially identical in the constitution with those described in "Ibutsu Konnyu Joken to Korogari Tsukare Jumyo (Contaminated conditions and rolling fatigue life)" (NSK Technical Journal No. 655, p. 17–24, 1993). A deep groove ball bearing (6206 type) was employed as a test bearing. In the test, the test load was Fr=900 kgf while the rotational speed was adjusted to 3,900 rpm. As the lubricant, use was made of a turbine oil VG68.

EXPERIMENT 1

As a contaminant, 0.005 g of 1% steel beads (44 to 74 μm in size) of Hv 730 were added to the lubricant. The bearing was rotated under the contaminated conditions to thereby form the initial impression on the raceway. Next, the bearing was washed and taken apart. Only the outer race and the rolling elements were replaced by fresh ones, thus giving a bearing having the inner race with impression. Subsequently, this bearing was subjected to a durability test under clean lubrication without any contaminant.

The durability test of the experiment 1 was repeated 10 times for each sample. In the durability test, the operation was ceased when the vibration value attained 5 times as high as the initial level. Then, flaking was examined to thereby judge the termination of the test. The thus calculated life of the bearing was about 45 hours. Therefore, the test was continued for 150 hours, i.e., thrice as long as the calculated life.

Table 2 shows the average particle diameters (nm) of the titanium carbide and titanium carbonitride deposited in the steels, the area fractions thereof and the results of the experiment 1. As Table 2 clearly shows, the titanium carbide and titanium carbonitride deposited in the steels of Examples 1a to 5a showed average particle diameters of 20 nm or less. Each of these samples showed a bearing L10 life longer 50 hours, i.e., exceeding the calculated life and being longer than the L10 lives of the bearings of Comparative Examples 1a to 15a. The steels of Examples 6a to 10a showed average particle diameters of titanium carbide and titanium carbonitride deposited therein of 10 nm or less. The bearing L10 lives of these Examples were about 100 hours, i.e., being longer than those of Comparative Examples 1a to 15a. The steels of Examples 11a to 15a showed average particle diameters of titanium carbide and titanium carbonitride deposited therein of 5 nm or less. These bearings suffered from no flaking at any part even after performing the test for 150 hours. Thus, the test was ceased at that point.

In Comparative Examples 1a to 15a, all of the bearings showed L10 lives shorter than the calculated one. Every flaking site originated in an impression caused by the contaminant. Although the steel of Comparative Example 3a contained 0.12% by weight of titanium, fine titanium carbide or titanium carbonitride particles could not be dispersed therein since no solution treatment had been performed. Thus, the bearing showed a short life. In other Comparative Examples, the contents of titanium and nitrogen were inappropriate and thus fine titanium carbide or titanium carbonitride particles of 20 nm or less in diameter could not be dispersed. That is to say, titanium carbide or titanium carbonitride particles of 20 nm or less in diameter could not be formed in the steels of Comparative Examples 1a to 15a. As a result, the raceway surfaces were liable to suffer from severe impressions and cracks spread rapidly, which shortened the life.

EXPERIMENT 2

The experiment 2 was performed under clean lubrication conditions with the use of a lubricant (VG68) free from any contaminant. The test apparatus, test bearing type, load and rotational speed were the same as the corresponding ones employed in the above experiment 1. The bearings tested were those composed of outer races and inner races of the compositions of Examples 1a, 7a and 14a and Comparative Examples 1a, 8a and 15a as shown in Table 1 and rolling elements made of the conventional bearing steels of 2 types. In the experiment 2, the durability test was repeated 10 times for each sample. To judge the termination of the test, the operation was ceased when the vibration value attained 5 times as high as the initial level. Then, flaking was examined. Thus, the test was continued for 1000 hours.

As Table 3 shows, an L10 life of 987 hours (2/10 with inner race flaking) was effected in Example 1a, while the L10 life in Example 7a exceeded 1,000 hours (1/10 with inner race flaking). In Example 14a, the L10 life reached 1,500 hours while showing no flaking in any part of the bearing. In contrast thereto, the L10 lives of Comparative Examples 1a, 8a and 15a were respectively 427 hours (5/10 with inner race flaking), 456 hours (4/10 with inner race flaking) and 478 hours (with 4/10 inner race flaking).

In each of Examples 1a, 7a, 14a and Comparative Examples 1a, 8a and 15a, the test operation was ceased 400 hours after the initiation. Then, each bearing was cut at the raceway center in the circumferential direction and the micro-constitution after corrosion was observed. As a result, the bearings of the inventions showed no constitutional change while all of the comparative samples showed constitutional changes.

EXPERIMENT 3

The experiment 3 was performed under lubrication with the use of the lubricant VG68 containing 1 wt % of water. The test apparatus, test bearing type, load and rotational speed were the same as the corresponding ones employed in the above experiment 1. The bearings tested were those composed of outer races and inner races of the compositions of Examples 1a, 7a and 14a and Comparative Examples 1a, 8a and 15a as shown in Table 1 and rolling elements made of the conventional bearing steels of 2 types. In the experiment 3, the durability test was repeated 10 times for each sample. To judge the termination of the test, the operation was ceased when the vibration value attained 5 times as high as the initial level. Then, flaking was examined.

As Table 4 shows, an L10 life of 412 hours (4 with inner race flaking and 4 with outer race flaking, i.e., 8/10 in total) was effected in Example 1a, while the L10 life in Example 7a exceeded 501 hours (3 with inner race flaking and 3 with outer race flaking, i.e., 6/10 in total) and that in Example 14a was 625 hours (3 with inner race flaking and 3 with outer race flaking, i.e., 6/10 in total). In contrast thereto, the L10 lives of Comparative Examples 1a, 8a and 15a were respectively 162 hours (5 with inner race flaking and 5 with outer race flaking, i.e., 10/10 in total), 178 hours (5 with inner race flaking and 5 with outer race flaking, i.e., 10/10 in total) and 185 hours (5 with inner race flaking and 5 with outer race flaking, i.e., 10/10 in total).

In Examples 1a, 7a and 14a, the average particle diameters of titanium carbide/titanium carbonitride were respectively 17 nm, 8 nm and 5 nm. In contrast thereto, neither titanium carbide nor titanium carbonitride was formed in Comparative Example 1a. In Comparative Examples 8a and 15a, the average particle diameters of titanium carbide and titanium carbonitride were larger (i.e., 129 nm and 96 nm) than those in Examples. Therefore, hydrogen could not be dispersed and adsorbed and thus no prolonged life could be effected in Comparative Examples 1a, 8a and 15a.

FIG. 2 is a graph formed by plotting the results of an examination on the effects of the average particle diameter of the deposit on the L10 life wherein the abscissa refers to the average particle diameter (nm) of the titanium-based deposit dispersed in the steel while the ordinate refers to the L10 life (hours). As FIG. 2 clearly shows, it is found out that the L10 life of the bearing is rapidly prolonged in the region wherein the average particle diameter of the titanium carbide and titanium carbonitride deposits is 20 nm or less.

As described above, the raceway surface of a bearing becomes highly resistant against impression by dispersing fine particles of titanium carbide, titanium carbonitride, etc. with an average particle diameter of 20 nm or less in steel. Moreover, the spreading of cracks originating in impressions, if any, can be retarded thereby. Further, constitutional changes caused by matrix fatigue can be prevented or retarded thereby and thus the rolling life can be largely prolonged under contaminated lubrication conditions or clean lubrication conditions, compared with bearings of the conventional type.

Under the invasion of water, the titanium carbide and titanium carbonitride particles of 20 nm or less serve as hydrogen trap sites and thus disperse and adsorb hydrogen at the titanium carbide and titanium carbonitride interfaces, thus preventing the occurrence of any defect. These particles also lower the hydrogen concentration at the plastic deformation region at the crack end and, as a result, can retard corrosion pitting (including hydrogen induced cracking).

The materials employed in Examples 1a to 15a were previously subjected to the conventional heat treatments so as to regulate the retained austenite content to 5 to 20 vol % in the vicinity of the surface of the bearing components. Similar effects can be effected in the case of bearings which have been subjected to a dimensional stabilization treatment to thereby reduce the retained auslenite content to 5 vol % or less.

In the rolling bearing of the present invention, at least one of the fixed race, the rotating race and the rolling elements should satisfy the composition and constitution as defined above. Namely, various modifications may be made within this scope. For example, the L10 life of the whole bearing can be remarkably prolonged merely by using, as the inner race which would be damaged most seriously, a steel which satisfies the composition of from 0.65 to 1.20% by weight of carbon, from 0.05 to 0.70% by weight of silicon, from 0.2 to 1.5% by weight of manganese, from 0.015 to 2.0% by weight of chromium, from 0.05 to 0.40% by weight of titanium, not more than 0.01% by weight of nitrogen and in which titanium carbide and titanium carbonitricle particles having an average particle diameter of 20 nm or less is dispersed and deposited in the steel at a density of at least $500/\mu m^2$ (0.20 $\mu m^2 \times 5$ fields).

TABLE 1

| | C wt % | Si wt % | Mn wt % | Cr wt % | Ti wt % | N wt % | Solution Treatment Temperature °C. |
|---|---|---|---|---|---|---|---|
| Example | | | | | | | |
| 1a | 0.98 | 0.24 | 0.35 | 1.33 | 0.05 | 0.0082 | 1150 |
| 2a | 0.88 | 0.08 | 0.56 | 2.00 | 0.19 | 0.0095 | 1150 |
| 3a | 1.00 | 0.28 | 0.20 | 0.95 | 0.15 | 0.0012 | 1200 |
| 4a | 0.78 | 0.68 | 1.05 | 0.35 | 0.28 | 0.0074 | 1200 |
| 5a | 0.89 | 0.22 | 0.43 | 0.79 | 0.23 | 0.0063 | 1250 |
| 6a | 0.87 | 0.12 | 0.33 | 0.15 | 0.07 | 0.0025 | 1200 |
| 7a | 1.15 | 0.34 | 0.24 | 1.51 | 0.15 | 0.0034 | 1200 |
| 8a | 1.05 | 0.05 | 1.50 | 0.97 | 0.18 | 0.0039 | 1250 |
| 9a | 0.66 | 0.70 | 0.46 | 1.56 | 0.40 | 0.0013 | 1250 |
| 10a | 0.95 | 0.32 | 0.41 | 0.90 | 0.14 | 0.0022 | 1300 |
| 11a | 0.84 | 0.25 | 1.50 | 1.15 | 0.20 | 0.0078 | 1300 |
| 12a | 1.20 | 0.49 | 0.24 | 1.00 | 0.13 | 0.0051 | 1300 |
| 13a | 0.65 | 0.09 | 0.36 | 0.89 | 0.37 | 0.0026 | 1350 |
| 14a | 0.99 | 0.33 | 0.27 | 1.49 | 0.32 | 0.0041 | 1350 |
| 15a | 1.08 | 0.25 | 0.44 | 1.10 | 0.17 | 0.0013 | 1350 |
| Comparative Example | | | | | | | |
| 1a | 0.97 | 0.45 | 0.35 | 1.45 | — | 0.0047 | — |
| 2a | 0.77 | 0.15 | 0.34 | 0.45 | 0.07 | 0.0150 | — |
| 3a | 0.86 | 0.38 | 0.25 | 0.98 | 0.12 | 0.0051 | — |
| 4a | 1.06 | 0.28 | 0.25 | 0.91 | 0.49 | 0.0068 | — |
| 5a | 1.08 | 0.41 | 0.47 | 1.05 | 0.03 | 0.0055 | — |
| 6a | 1.18 | 0.33 | 0.31 | 1.12 | — | 0.0013 | 1150 |
| 7a | 0.67 | 0.42 | 0.58 | 0.88 | 0.01 | 0.0066 | 1150 |
| 8a | 0.96 | 0.23 | 0.36 | 1.38 | 0.10 | 0.0883 | 1150 |
| 9a | 0.96 | 0.70 | 0.32 | 0.95 | 0.47 | 0.0071 | 1150 |
| 10a | 1.05 | 0.65 | 0.71 | 1.13 | 0.02 | 0.0036 | 1200 |
| 11a | 1.12 | 0.34 | 1.08 | 0.36 | — | 0.0035 | 1300 |
| 12a | 0.68 | 0.28 | 0.77 | 1.02 | 0.01 | 0.0125 | 1300 |
| 13a | 0.76 | 0.31 | 0.25 | 0.91 | 0.51 | 0.0290 | 1300 |
| 14a | 0.88 | 0.46 | 0.44 | 0.98 | 0.03 | 0.0061 | 1300 |
| 15a | 0.95 | 0.27 | 0.31 | 1.59 | 0.05 | 0.0350 | 1350 |

TABLE 2

| | TiC, TiCN (nm) | L10 (hr) | Flaking Mode | Area Fraction (%) of TiC, TiCN of 20 nm or less |
|---|---|---|---|---|
| Example | | | | |
| 1a | 17 | 60 | 10/10 inner race flaking | 0.5 |
| 2a | 20 | 57 | 10/10 inner race flaking | 4.6 |
| 3a | 12 | 85 | 10/10 inner race flaking | 2.7 |
| 4a | 18 | 55 | 10/10 inner race flaking | 10.2 |
| 5a | 14 | 73 | 10/10 inner race flaking | 9.8 |
| 6a | 10 | 106 | 10/10 inner race flaking | 1.1 |
| 7a | 8 | 112 | 8/10 inner race flaking | 3.5 |

TABLE 2-continued

| | TiC, TiCN (nm) | L10 (hr) | Flaking Mode | Area Fraction (%) of TiC, TiCN of 20 nm or less |
|---|---|---|---|---|
| 8a | 9 | 103 | 10/10 inner race flaking | 6.8 |
| 9a | 8 | 120 | 8/10 inner race flaking | 20.1 |
| 10a | 7 | 130 | 9/10 inner race flaking | 2.3 |
| 11a | 5 | 150 | no flaking | 7.4 |
| 12a | 4 | 150 | no flaking | 1.2 |
| 13a | 5 | 150 | no flaking | 13.4 |
| 14a | 5 | 150 | no flaking | 15.6 |
| 15a | 3 | 150 | no flaking | 4.6 |
| Comparative Example | | | | |
| 1a | 0 | 12 | 10/10 inner race flaking | |
| 2a | 109 | 25 | 10/10 inner race flaking | |
| 3a | 213 | 15 | 10/10 inner race flaking | |
| 4a | 360 | 10 | 10/10 inner race flaking | |
| 5a | 189 | 16 | 10/10 inner race flaking | |
| 6a | 0 | 11 | 10/10 inner race flaking | |
| 7a | 250 | 17 | 10/10 inner race flaking | |
| 8a | 129 | 21 | 10/10 inner race flaking | |
| 9a | 322 | 11 | 10/10 inner race flaking | |
| 10a | 315 | 9 | 10/10 inner race flaking | |
| 11a | 0 | 13 | 10/10 inner race flaking | |
| 12a | 156 | 19 | 10/10 inner race flaking | |
| 13a | 116 | 21 | 10/10 inner race flaking | |
| 14a | 87 | 31 | 10/10 inner race flaking | |
| 15a | 96 | 29 | 10/10 inner race flaking | |

TABLE 3

Results of Life Test of Experiment 2

| | TiC, TiCN (nm) | L10 (hr) | Flaking Mode |
|---|---|---|---|
| Ex. | | | |
| 1a | 17 | 987 | 2/10 inner race flaking |
| 2a | 8 | 1000 | 1/10 inner race flaking |
| 14a | 5 | 1500 | no flaking |
| Comp. Ex. | | | |
| 1a | 0 | 427 | 5/10 inner race flaking |
| 8a | 129 | 456 | 4/10 inner race flaking |
| 15a | 96 | 478 | 4/10 inner race flaking |

TABLE 4

Results of Life Test in Experiment 3

| | TiC, TiCN (nm) | L10 (hr) | Flaking Mode |
|---|---|---|---|
| Ex. | | | |
| 1a | 17 | 412 | 4 inner race flaking, 4 outer race flaking |
| 2a | 8 | 501 | 3 inner race flaking, 3 outer race flaking |
| 14a | 5 | 625 | 3 inner race flaking, 3 outer race flaking |
| Comp. Ex. | | | |
| 1a | 0 | 162 | 5 inner race flaking, 5 outer race flaking |
| 8a | 129 | 178 | 5 inner race flaking, 5 outer race flaking |
| 15a | 96 | 185 | 5 inner race flaking, 5 outer race flaking |

According to the present invention, from 0.05 to 0.40% of titanium is added to the sttel so that at at least 100 fine paticles, per 1 $\mu m^2$ (0.20 $\mu m^2 \times 5$ fields), of titanium carbide or titanium carbonitride of 20 nm or less in average particle diameter are dispersed therein, as shown in FIG. 3, at an area fraction of from about 0.5 to 20%, thus preventing the raceway surface from impression even though the lubricant film is contaminated with impurities, as indicated by the above description.

When cracking arises in the raceway surface, furthermore, the spreading of the cracks can be retarded owing to the high toughness, thus prolonging the life.

Further, constitutional changes caused by matrix fatigue can be prevented or retarded and thus the rolling life can be prolonged, compared with the conventional bearings.

Under the invasion of water, the titanium carbide and titanium carbonitride pacrticles of 20 nm or less in average particle diameter serve as hydrogen trap sites and thus disperse and adsorb hydrogen at the titanium carbide and titanium carbonitride interfaces, thus preventing the occurrence of any defect. These particles also lower the hydrogen concentration at the plastic deformation region at the crack end and, as a result, can retard corrosion pitting (including hydrogen induced cracking).

Moreover, it is expected that the life can be further prolonged by dispersing fine particles of titanium carbide and titanium carbonitride of 10 nm or less in average particle diameter.

It is still preferable to disperse a great number of fine particles of titanium carbide and titanium carbonitride of 5 nm or less in average particle diameter to thereby further prolong the life.

II. Second Embodiment

Table 5 summarizes the components (% by weight) of the samples employed in Examples 1b to 20b and Comparative Examples 1b to 15b. The samples of Examples 1b to 20b each has a composition falling within the range as specified in the present invention, while the compositions of the samples of Comparative Examples 1b to 15b are excluded therefrom in Ti, Nb, Al or N, or have an average particle diameter of the deposits excluded from the range defined in the second embodiment.

In the life tests performed in Examples and Comparative Examples, the bearing inner and outer races were produced by using the sample materials of the compositions as listed in Table 5. To dissolve Ti, Nb or Al in the matrix, each sample material was subjected to a solution treatment by heating to 1,150 to 1,350° C., then normalized at 850 to 950° C. and spheroidized. Thus, TiC, TiCN or NbC, NbCN or AlN were dispersed and deposited as fine particles.

Subsequently, the sample materials of Examples were exclusively heated to 950 to 1,150° C. for several minutes to give TiC, TiCN, NbC, NbCN or AlN particles of 50 to 300 nm in average diameter which were thus dispersed and deposited. The inner and outer races were cold processed followed by the conventional heat treatments (hardening at 840° C., oil quenching and tempering at 170° C.) to thereby give bearings.

The steel employed in Comparative Example 1b was the bearing steel of type 2 (usual SUJ2), those employed in Comparative Examples 2b and 3b were obtained by subjecting the material described in JP-A-5-255809 to the conventional heat treatment, and those employed in Comparative Examples 4b and 5b were obtained by carburizing the material described in JP-A-9-53150.

The dispersion and deposition of TiC, TiCN, NbC, NbCN and AlN were examined in the following manner. After the completion of the heat treatment, each bearing was cut and the section was polished with a baff. After performing niter corrosion, it was subjected to carbon deposition. The, the replica of thus extracted fine carbides was observed. In this step, TiC, TiCN, NbC, NbCN and AlN were identified by specifying each compound from the crystalline structure depending on the interstitial constant determined by electron beam analysis with the use of a TEM (transmission electron microscope) and EDX (energy dispersive X-ray spectrometry. Then, the field was observed (a 50,000×magnification) so that the average particle diameter and grain number were determined. One field was adjusted to 3 $\mu m^2$ and 10 fields selected at random were observed (i.e., 30 $\mu m^2$ in total). Then, the average grain size and grain number were determined. As a result, it was confirmed in Examples 1b to 20b that more than 50 particles of TiC, TiCN, NbC, NbCN and AlN of 50 to 300 nm in average diameter were observed per 30 $\mu m^2$.

Next, the bearings of Examples and those of Comparative Examples were subjected to life tests according to Experiments 4 to 6 using the same apparatus as in Experiments 1 to 3.

EXPERIMENT 4

As a contaminant, 0.005 g of 1% steel beads (44 to 74 $\mu$m in size) of Hv 730 were added to the lubricant (1 liter). The bearing was rotated under the contaminated conditions to thereby form the initial impression on the raceway. Next, the bearing was washed and taken apart. Only the outer race and the rolling elements were replaced by fresh ones made of the bearing steel type 2, thus giving a bearing having the inner race with impression. Subsequently, this bearing was subjected to a durability test under clean lubrication without any contaminant. The durability test of the experiment 4 was repeated 10 times for each sample. In the durability test, the operation was ceased when the vibration value attained 5 times as high as the initial level. The, flaking was examined to thereby judge the termination of the test. The thus calculated life of the bearing was about 45 hours. Therefore, the test was continued for 200 hours, i.e., about 5 times as long as the calculated life.

In the experiment 4, only the inner races were evaluated. The inner races had surface hardness (HRC: Rockwell C scale) of from 60 to 66, retained austenite content of from 5 to 20 vol % and raceway surface roughness of 0.01 to 0.03 $\mu$m Ra. In both of Examples and Comparative Examples, the outer races and rolling elements were made of the same bearing steel of type 2 having been thermally treated which had surface hardness of HRC 59 to 63, and raceway surface roughness of 0.01 to 0.03 $\mu$m Ra (outer races) or 0.003 to 0.010 $\mu$m Ra (rolling elements).

Table 6 and FIG. 4 show the results. Table 6 shows the average particle diameters (nm) of the TiC, TiCN, NbC, NbCN and AlN deposits, the crystal grain size numbers, L10 lives (hour) and flaking modes. FIG. 4 is a graph wherein the abscissa refers to the average particle diameter (nm) of the TiC, TiCN, NbC, NbCN and AlN deposits dispersed in the steel while the ordinate refers to the L10 life (hours) and the correlationship between these factors were examined in Examples 1b to 20b and Comparative Examples 1b to 15b.

As these data show, the average particle diameters of TiC and TiCN in the steels of Examples 1b to 20b were 50 to 300 nm and the bearing lives L10 thereof each were longer than 150 hours (i.e., thrice or more as long as the calculated life). Namely, the steels of Examples showed longer lives than those of Comparative Examples. In particular, the steels of Examples 4b, 7b, 12b, 13b and 14b showed each crystal grain size number of 14 or above and surface hardness of HRC 64 or more. They underwent no flaking even when the bearing life exceeded 200 hours. Thus, the operation was ceased at that point.

In Comparative Examples 1b to 15b, all of the bearings showed L10 lives comparable to or shorter than the calculated one. Every flaking site originated in an impression caused by the contaminant. In Comparative Examples 12b to 15b, in particular, TiC, TiCN, NbC, NbCN and AlN particles smaller than 50 nm were dispersed and no ultrafine crystal grains (about No. 9) could be formed. Thus, the hardness could not be improved in these cases and the raceway surface is liable to be suffered from severe impressions. In these Comparative Examples, cracks spread quickly and the bearings showed short lives. This is because the TiC, TiCN, NbC, NbCN and AlN particles in the second layer would reduce the area of grain boundary and lower the energy of the total grain boundary and immobilize the grains by preventing the migration thereof, thus contributing to the formation of fine crystal grains. When the particles in the second layer were ultra-fine one having 50 to 300 nm (for example, less than 50 nm), therefore, the pinning effect could not prevent enlargement of the crystal grains and, as a result, no ultrafine crystal grains (No. 11.9 or above) could be obtained, thus failing to prolonging the life.

In Comparative Examples 1b to 11b, the contents of Ti, Nb and Al were inappropriate and these particles showed average diameters of 480 nm or above. Thus, no ultrafine crystal grain could be formed and thus any prolongation in the life could be effected.

As FIG. 4 clearly shows, the bearings in which the average particle diameters of the deposits in the steels were excluded from the scope of 50 to 300 nm (i.e., Comparative Examples 1b to 15b) showed short L10 lives of 13 to 68 hours, while the bearings in which the average particle diameters of the deposits in the steels were within the scope of 50 to 300 nm (i.e., Examples 1b to 20b) showed largely prolonged L10 lives of 150 to 200 hours.

EXPERIMENT 5

The experiment 5 was performed under clean lubrication conditions with the use of a lubricant (VG68) free from any contaminant. The test apparatus, test bearing type, load and rotational speed were the same as the corresponding ones employed in the above experiment 4. The bearings tested were those composed of outer races and inner races of the compositions of Examples 1b, 13b and 17b and Comparative Examples 1b, 7b and 14b as shown in Table 9 and rolling elements made of the conventional bearing steels of type 2 (conventional SUJ2). In the experiment 5, the durability test was repeated 10 times for each sample. To judge the termination of the test, the operation was ceased when the vibration value attained 5 times as high as the initial level. The, flaking was examined. Thus, the test was continued for 1000 hours.

Table 7 shows the results of the experiment 5. As Table 7 indicates, an L10 life of 991 hours (2/10 with inner race flaking) was effected in Example 1b, while the L10 life in Example 13b exceeded 1,000 hours (1/10 with inner race flaking). In Example 17b, the L10 life reached 1,500 hours while showing no flaking in any part of the bearing.

In contrast thereto, the L10 lives of Comparative Examples 1b, 7b and 14b were 382 hours (5/10 with inner race flaking), 415 hours (5/10 with inner race flaking) and 611 hours (with 3/10 inner race flaking), respectively.

In each of Examples 1b, 13b, 17b and Comparative Examples 1b, 7b and 14b, the test operation was ceased 400 hours after the initiation. Then, each bearing was cut at the raceway center in the circumferential direction and the micro-constitution after corrosion was observed. As a result, the bearings of the inventions showed no constitutional change while all of the comparative samples showed constitutional changes.

EXPERIMENT 6

In the experiment 6, the feeding of the lubricant 8 into the bearing 10 was stopped in the test apparatus 1 shown in FIG. 1. Then, E grease 8 was encapsulated therein to give a test sample. Next, 1 wt % of water was added to the E grease and the grease was prevented from leakage by rubber sealing, prior to the initiation of the experiment. The "E grease" as used herein means one prepared in the following manner. Namely, urea was added as a thickener to a synthetic hydrocarbon oil (dynamic viscosity: 47.3 cSt at 40° C., 7.9 cSt at 100° C.). Then, the mixing consistency (25° C., 61 W) was adjusted to 250, the mixing stability (25° C., $10^5$ W) was adjusted to 364, the oxidization stability (99° C., 100 hours) was adjusted to 0.025 MPa, the oil release rate (99° C., 24 hours) was adjusted to 0.3%, the evaporation rate (99° C., 22 hours) was adjusted to 0.34%, the dropping point was adjusted to 260° C. or above and the water-washing durability (79° C., 1 hour) was adjusted to 2%. The, the products satisfying the copper plate corrosion requirement (100° C., 24 hours) were employed.

In this experiment, it was assumed that the temperature would increase rapidly. Thus, the housing was provided with a cooling device and the bearding temperature was maintained at 70 to 80° C. The test apparatus, test bearing type, load and rotational speed were the same as the corresponding ones employed in the above experiment 4. The bearings tested were those composed of outer races and inner races of the compositions of Examples 1b, 13b and 17b and Comparative Examples 1b, 7b and 14b as shown in Table 9 and rolling elements made of the conventional bearing steels of type 2 (conventional SUJ2). In the experiment 6, the durability test was repeated 10 times for each sample. To judge the termination of the test, the operation was ceased when the vibration value attained 5 times as high as the initial level. Then, flaking was examined. The operation was ceased 500 hours after the initiation of the test.

Table 8 summarizes the results of the experiment 6. As Table 8 shows, an L10 life of 538 hours (4 with inner race flaking and 4 with outer race flaking, i.e., 8/10 in total) was exhibited in Example 1b, while the L10 life in Example 13b was 569 hours (3 with inner race flaking and 3 with outer race flaking, i.e., 6/10 in total) and that in Example 17b was 624 hours (3 with inner race flaking and 3 with outer race flaking, i.e., 6/10 in total).

In contrast thereto, the L10 lives of Comparative Examples 1b, 7b and 14b were 186 hours (5 with inner race flaking and 5 with outer race flaking, i.e., 10/10 in total), 193 hours (5 with inner race flaking and 5 with outer race flaking, i.e., 10/10 in total), and 205 hours (5 with inner race flaking and 5 with outer race flaking, i.e., 10/10 in total), respectively.

In Examples 1b, 13b and 17b, the crystal grain size numbers were 11.9, 15.1 and 12.8, respectively. In contrast, no TiC, TiCN, NbC, NbCN or AlN was formed in Comparative Examples 1b, 7b and 14b. Thus, the crystal grain size numbers in these Comparative Examples were 8.7, 8.6 and 9.5, respectively. In these Comparative Examples wherein the crystal particle sizes were larger than those in Examples, hydrogen could not be dispersed or deposited at the grain boundary and thus no prolonged life could be established.

As described above, fine particles of average diameter of 50 to 300 nm of Ti carbide, Ti carbonitride, Nb carbide, Nb carbonitride or Al nitride were dispersed in the steels in the above Examples. Thus, the austenite crystal grains became ultrafine and the bearing hardness was elevated. As a result, the wear resistance was improved and the raceway surface of a bearing became highly resistant against impression. Moreover, the spreading of cracks originating in impressions, if any, could be retarded thereby. Further, constitutional changes caused by matrix fatigue can be prevented or retarded thereby and thus the rolling life can be largely prolonged under contaminated lubrication conditions or clean lubrication conditions, compared with bearings of the conventional type.

Under the invasion of water, hydrogen was trapped in the ultrafine intergranular face or the TiC, TiCN, NbC, NbCN or AlN particles served as hydrogen trap sites and thus dispersed and adsorbed hydrogen at the ultrafine carbide/nitride interfaces, thus preventing the occurrence of any defect. These particles also lowered the hydrogen concentration at the plastic deformation region at the crack end and, as a result, could retard corrosion pitting (including hydrogen induced cracking).

Table 9 shows the correlationship between crystal grain number (N) and average crystal grain size ($\mu$m).

The materials employed in the above Examples were previously subjected to the conventional heat treatments so as to regulate the retained austenite content to 5 to 20 vol %. Similar effects can be obtained in the case of bearings which have been subjected to a dimensional stabilization treatment to thereby reduce the retained austenite content to less than 5 vol %.

TABLE 5

| | C | Si | Mn | Cr | Ti | Nb | Al | N | TiC, TiCN, NbC, NbCN, AlN (nm) |
|---|---|---|---|---|---|---|---|---|---|
| Example | | | | | | | | | |
| 1b | 0.99 | 0.24 | 0.34 | 1.33 | 0.05 | — | — | 0.0082 | 51 |
| 2b | 0.88 | 0.08 | 0.54 | 2.00 | 0.26 | — | — | 0.0095 | 78 |
| 3b | 1.00 | 0.28 | 0.21 | 0.95 | 0.15 | — | — | 0.0012 | 69 |
| 4b | 0.78 | 0.68 | 1.05 | 0.35 | 0.40 | — | — | 0.0095 | 125 |
| 5b | 0.89 | 0.22 | 0.44 | 0.15 | — | 0.12 | — | 0.0063 | 71 |
| 6b | 0.86 | 0.12 | 0.33 | 1.38 | — | 0.31 | — | 0.0025 | 95 |
| 7b | 1.16 | 0.34 | 0.25 | 1.53 | — | 0.40 | — | 0.0034 | 156 |
| 8b | 0.70 | 0.05 | 1.38 | 0.96 | — | 0.05 | — | 0.0039 | 53 |
| 9b | 0.70 | 0.70 | 0.44 | 1.56 | — | — | 0.05 | 0.0013 | 60 |
| 10b | 0.98 | 0.32 | 0.41 | 0.89 | — | — | 0.14 | 0.0022 | 88 |
| 11b | 0.85 | 0.26 | 1.50 | 1.15 | — | — | 0.28 | 0.0078 | 102 |
| 12b | 1.20 | 0.49 | 0.22 | 1.05 | — | — | 0.40 | 0.0088 | 178 |

TABLE 5-continued

|  | C | Si | Mn | Cr | Ti | Nb | Al | N | TiC, TiCN, NbC, NbCN, AlN (nm) |
|---|---|---|---|---|---|---|---|---|---|
| 13b | 0.65 | 0.09 | 0.38 | 0.87 | 0.05 | 0.19 | — | 0.0026 | 155 |
| 14b | 0.97 | 0.33 | 0.27 | 1.47 | 0.28 | 0.08 | — | 0.0041 | 163 |
| 15b | 0.72 | 0.65 | 0.35 | 1.32 | — | 0.22 | 0.15 | 0.0024 | 214 |
| 16b | 1.17 | 0.19 | 0.47 | 0.22 | — | 0.38 | 0.06 | 0.0087 | 236 |
| 17b | 0.79 | 0.22 | 0.25 | 1.57 | 0.35 | — | 0.11 | 0.0066 | 256 |
| 18b | 0.66 | 0.25 | 0.13 | 1.91 | 0.07 | — | 0.23 | 0.0041 | 198 |
| 19b | 0.98 | 0.32 | 1.43 | 1.36 | 0.16 | 0.15 | 0.33 | 0.0025 | 284 |
| 20b | 0.78 | 0.15 | 0.44 | 0.55 | 0.29 | 0.06 | 0.14 | 0.0055 | 297 |
| Comp. Ex. | | | | | | | | | |
| 1b | 1.05 | 0.35 | 0.29 | 1.45 | — | — | — | 0.0063 | 0 |
| 2b | 0.67 | 0.25 | 0.45 | 3.51 | — | 0.10 | 0.03 | 0.0133 | 678 |
| 3b | 0.77 | 0.19 | 0.27 | 2.12 | — | 0.01 | 0.02 | 0.0153 | 498 |
| 4b | 0.16 | 0.34 | 0.55 | 0.61 | 0.30 | — | 0.02 | 0.0082 | 591 |
| 5b | 0.16 | 0.33 | 0.56 | 0.61 | 0.02 | 0.03 | 0.02 | 0.0023 | 538 |
| 6b | 1.19 | 0.44 | 0.31 | 1.11 | 0.03 | — | — | 0.0019 | 509 |
| 7b | 0.68 | 0.41 | 0.57 | 0.88 | — | 0.02 | — | 0.0025 | 492 |
| 8b | 0.96 | 0.23 | 0.38 | 1.40 | — | — | 0.03 | 0.0021 | 486 |
| 9b | 0.94 | 0.77 | 0.33 | 0.95 | 0.51 | — | — | 0.0089 | 567 |
| 10b | 1.05 | 0.65 | 0.72 | 1.13 | — | 0.55 | — | 0.0068 | 571 |
| 11b | 1.22 | 0.33 | 0.56 | 0.36 | — | — | 0.48 | 0.0079 | 552 |
| 12b | 0.68 | 0.28 | 1.05 | 1.12 | 0.15 | — | — | 0.0068 | 12 |
| 13b | 0.77 | 0.29 | 0.25 | 0.89 | — | 0.24 | — | 0.0053 | 34 |
| 14b | 0.88 | 0.18 | 0.44 | 0.95 | — | — | 0.34 | 0.0042 | 26 |
| 15b | 0.93 | 0.27 | 0.30 | 1.59 | 0.15 | 0.05 | 0.11 | 0.0082 | 18 |

TABLE 6

|  | TiC, TiCN, NbC, NbCN, AlN (nm) | Crystal Grain Size No. | L10 (hr) | Flaking Mode |
|---|---|---|---|---|
| Example | | | | |
| 1b | 51 | 11.9 | 151 | 8/10 inner race flaking |
| 2b | 78 | 12.8 | 163 | 6/10 inner race flaking |
| 3b | 69 | 12.3 | 159 | 6/10 inner race flaking |
| 4b | 125 | 14.3 | 200 | no flaking |
| 5b | 71 | 12.5 | 162 | 7/10 inner race flaking |
| 6b | 95 | 12.7 | 169 | 7/10 inner race flaking |
| 7b | 156 | 14.8 | 200 | no flaking |
| 8b | 53 | 12.0 | 163 | 7/10 inner race flaking |
| 9b | 60 | 12.4 | 165 | 6/10 inner race flaking |
| 10b | 88 | 13.0 | 174 | 4/10 inner race flaking |
| 11b | 102 | 13.6 | 187 | 4/10 inner race flaking |
| 12b | 178 | 14.2 | 200 | no flaking |
| 13b | 155 | 15.1 | 200 | no flaking |
| 14b | 163 | 14.7 | 200 | no flaking |
| 15b | 214 | 13.4 | 182 | 4/10 inner race flaking |
| 16b | 236 | 13.0 | 175 | 5/10 inner race flaking |
| 17b | 256 | 12.8 | 171 | 6/10 inner race flaking |
| 18b | 198 | 13.5 | 180 | 3/10 inner race flaking |
| 19b | 284 | 12.1 | 161 | 8/10 inner race flaking |
| 20b | 297 | 11.9 | 158 | 8/10 inner race flaking |
| Comp. Example | | | | |
| 1b | 0 | 8.7 | 13 | 10/10 inner race flaking |
| 2b | 678 | 10.5 | 59 | 10/10 inner race flaking |
| 3b | 498 | 10.1 | 50 | 10/10 inner race flaking |
| 4b | 591 | 7.3 | 19 | 10/10 inner race flaking |
| 5b | 538 | 7.0 | 18 | 10/10 inner race flaking |
| 6b | 509 | 8.3 | 23 | 10/10 inner race flaking |
| 7b | 492 | 8.6 | 25 | 10/10 inner race flaking |
| 8b | 486 | 8.0 | 21 | 10/10 inner race flaking |
| 9b | 567 | 10.2 | 26 | 10/10 inner race flaking |
| 10b | 571 | 9.8 | 31 | 10/10 inner race flaking |
| 11b | 552 | 10.1 | 28 | 10/10 inner race flaking |
| 12b | 12 | 9.3 | 60 | 10/10 inner race flaking |
| 13b | 34 | 9.8 | 68 | 10/10 inner race flaking |
| 14b | 26 | 9.5 | 65 | 10/10 inner race flaking |
| 15b | 18 | 9.0 | 63 | 10/10 inner race flaking |

TABLE 7

Results of Life Test of Experiment 5

|  | TiC, TiCN, NbC, NbCN, AlN (nm) | Crystal Grain Size No. | L10 (hr) | Flaking Mode |
|---|---|---|---|---|
| Ex. | | | | |
| 1b | 51 | 11.9 | 991 | 2/10 inner race flaking |
| 13b | 155 | 15.1 | 1000 | 1/10 inner race flaking |
| 17b | 256 | 12.8 | 1500 | no flaking |
| Comp. Ex. | | | | |
| 1b | 0 | 8.7 | 382 | 5/10 inner race flaking |
| 7b | 492 | 8.6 | 415 | 5/10 inner race flaking |
| 14b | 26 | 9.5 | 611 | 3/10 inner race flaking |

TABLE 8

Results of Life Test in Experiment 6

|  | TiC, TiCN, NbC, NbCN, AlN (nm) | Crystal Grain Size No. | L10 (hr) | Flaking Mode |
|---|---|---|---|---|
| Ex. | | | | |
| 1b | 51 | 11.9 | 538 | 4 inner race flaking, 4 outer race flaking |
| 13b | 155 | 15.1 | 569 | 3 inner race flaking, 3 outer race flaking |

TABLE 8-continued

Results of Life Test in Experiment 6

| | TiC, TiCN, NbC, NbCN, AlN (nm) | Crystal Grain Size No. | L10 (hr) | Flaking Mode |
|---|---|---|---|---|
| 17b | 256 | 12.8 | 624 | 3 inner race flaking, 3 outer race flaking |
| Comp. Ex. | | | | |
| 1b | 0 | 8.7 | 186 | 5 inner race flaking, 5 outer race flaking |
| 7b | 492 | 8.6 | 193 | 5 inner race flaking, 5 outer race flaking |
| 14b | 26 | 9.5 | 205 | 5 inner race flaking, 5 outer race flaking |

TABLE 9

| Grain Size No. (N) | Average Crystal Grain Size ($\mu$m) |
|---|---|
| 7 | 31 |
| 8 | 22 |
| 9 | 16 |
| 10 | 11 |
| 11 | 7.8 |
| 12 | 5.5 |
| 13 | 3.9 |
| 14 | 2.8 |
| 15 | 1.9 |

According to the present invention, from 0.05 to 0.40% of at least one of Ti, Nb and Al is added to the steel so that at least 50 fine particles, per 10 fields (30 $\mu$m$^2$) selected at random of fine particles of Ti carbide, Ti carbonitride, Nb carbide, Nb carbonitride or Al nitride of 50 to 300 nm in average particle diameter are dispersed in the surface and steel of the race. Thus, the crystal grains become ultrafine (No. 11.9 or above). The hardness of the steel can be elevated. The wear resistance can be improved, so the race surface scarcely suffers form impression even under the invasion of contaminants.

When cracking arises in the raceway surface, furthermore, the spreading of the cracks can be retarded owing to the high toughness. Further, constitutional changes caused by matrix fatigue can be prevented or retarded and thus the rolling life can be prolonged, compared with the conventional bearings.

Under the invasion of water, hydrogen is trapped in the ultrafine intergranular face or the TiC, TiCN, NbC, NbCN or AlN particles serve as hydrogen trap sites and thus disperse and adsorb hydrogen at the ultrafine carbide/nitride interfaces, thus preventing the occurrence of any defect. These particles also lowered the hydrogen concentration at the plastic deformation region at the crack end and, as a result, could retard corrosion pitting (including hydrogen induced cracking).

By elevating the crystal grain size to No. 14 or above, the bearing life can be further prolonged.

While the invention has been described in detail and with reference to specific embodiments thereof, it will be apparent to one skilled in the art that various changes and modifications can be made therein without departing from the spirit and scope thereof.

What is claimed is:

1. A rolling bearing having a plurality of rolling elements located between a fixed race and a rotating race, wherein at least one of bearing components comprising said fixed race, rotating race and rolling elements is made of a steel which contains from 0.65 to 1.20% by weight of C, from 0.05 to 0.70% by weight of Si, from 0.2 to 1.5% by weight of Mn, from 0.15 to 2.0% by weight of Cr, from 0.05 to 0.40% by weight of Ti, not more than 0.01% by weight of N and unavoidable contaminating elements and wherein at least one of titanium carbide and titanium carbonitride particles having an average particle diameter of 20 nm or less is dispersed and deposited in the vicinity of the surface of the at least one of bearing components.

2. The rolling bearing of claim 1, wherein the at least one of titanium carbide and titanium carbonitride has an average particle diameter of 10 nm or less.

3. The rolling bearing of claim 1, wherein the at least one of titanium carbide and titanium carbonitride has an average particle diameter of 5 nm or less.

4. The rolling bearing of claim 1, wherein 100 or more of the at least one of titanium carbide and titanium carbonitride particles are present per 1 $\mu$m$^2$.

5. The rolling bearing of claim 1, wherein retained austenite is present in an amount of from 5 to 20 vol % at least in the vicinity of the surface of the at least one of bearing components.

6. The rolling bearing of claim 1, wherein retained austenite is present in an amount of less than 5 vol % at least in the vicinity of the surface of the at least one of bearing components.

7. A rolling bearing having a plurality of rolling elements located between a fixed race and a rotating race, wherein at least one of bearing components comprising said fixed race, rotating race and rolling elements is made of a steel which contains from 0.05 to 0.40% by weight of at least one selected form the group consisting of Ti, Nb and Al along with from 0.65 to 1.20% by weight of C, from 0.05 to 0.70% by weight of Si, from 0.2 to 1.5% by weight of Mn, from 0.15 to 2.0% by weight of Cr, not more than 0.01% by weight of N, and unavoidable contaminating elements and wherein at least one of Ti carbide, Ti carbonitride, Nb carbide, Nb carbonitride and Al nitride having an average diameter of from 50 to 300 nm are dispersed and deposited at least in the vicinity of the surface of the at least one of bearing components.

8. The rolling bearing of claim 7, wherein the former austenite grains present in the vicinity of the surface have an average diameter of 7.8 $\mu$m.

9. The rolling bearing of claim 7, wherein 50 particles or more of the at least of Ti carbide, Ti carbonitride, Nb carbide, Nb carbonitride and Al nitride having an average diameter of 50 to 300 nm are present per 30 $\mu$m$^2$.

* * * * *